March 9, 1965   J. R. PERUCCA   3,173,131
MAGNETOSTRICTIVE APPARATUS
Filed March 19, 1958   2 Sheets-Sheet 1

INVENTOR
J. R. PERUCCA
BY
Kenneth B. Hamlin
ATTORNEY

March 9, 1965  J. R. PERUCCA  3,173,131
MAGNETOSTRICTIVE APPARATUS
Filed March 19, 1958  2 Sheets-Sheet 2

INVENTOR
J. R. PERUCCA
BY
*Kenneth B Hamlin*
ATTORNEY

United States Patent Office 3,173,131
Patented Mar. 9, 1965

3,173,131
MAGNETOSTRICTIVE APPARATUS
James R. Perucca, Sayreville, N.J., assignor to Bell Telephone Laboratories, Incorporated, New York, N.Y., a corporation of New York
Filed Mar. 19, 1958, Ser. No. 722,402
9 Claims. (Cl. 340—174)

This invention relates to magnetostrictive apparatus and more particularly to such apparatus employed for the production and utilization of ultrasonic impulses.

The generation of ultrasonic strain impulses in magnetoelastic materials in response to electrical driving signals is a feature characteristic of many signal delay lines and information storage devices. Such delay lines and storage devices commonly employ an input transducer consisting of a multi-turn winding which is coaxially positioned over a magnetoelastic wire, tube, or ribbon element so as to be inducitvely coupled thereto and to produce therein a longitudinal magnetic flux. In accordance with the particular magnetostrictive coefficient of the material used, the element will undergo either a contractive or distensive strain along the direction, but irrespective of the polarity, of the applied magnetic field. The magnitude of the strain impulse is, at least to a first approximation, related to the time rate of change of flux while the velocity of propagation is determined by the material used and the mode of vibration produced. The coaxially mounted transducer winding gives rise to a longitudinal wave having a velocity approximately equal to $\sqrt{E/\rho}$ where E is the modulus of elasticity of the magnetoelastic material and $\rho$ is its density. In nickel, a commonly used material, the velocity of propagation for a longitudinal wave is about $1.9 \times 10^5$ in./sec. Further information concerning such transducers may be found in "Electromechanical Transducers and Wave Filters" by W. P. Mason, published by D. Van Nostrand Company, Inc., at page 215 et seq. and in the references therein noted.

While for many purposes such conventional transducers continue to provide a satisfactory means for producing the desired ultrasonic impulses, the efficiency of conversion from electrical to acoustic energy is fairly low, each such transducer commonly introducing an insertion loss of about 25 db in circuit response. At not unreasonably high frequencies, the diameter of such input transducer windings tends to become a critical factor in maintaining optimum flux coupling with the increasingly small diameter magnetoelastic wire elements that are utilized. The mechanical and electrical design problems involved in constructing such input transducer windings for optimum coupling to the 1- or 2-mil-diameter magnetoelastic elements frequently specified are not inconsiderable and are further aggravated when the requirement for variable delay or alterable memory is set forth, thereby necessitating that the input transducer be readily movable to any specified position along the length of the magnetoelastic element.

The above-noted velocity of propagation achieved by the longitudinal strain impulse, as produced by the coaxially mounted input transducer winding, determines the physical length of the magnetoelastic element required to obtain a desired signal delay. It is immediately apparent that this physical dimension could be reduced by the production of a strain impulse which would propagate at a lower velocity, thereby achieving greater signal delay per unit length of magnetoelastic element.

Accordingly, it is an object of the present invention to improve the efficiency of magnetostrictive delay lines and memory elements.

It is another object to facilitate the generation of ultrasonic impulses in magnetostrictive delay lines and information storage devices.

It is another object of the present invention to obtain more compact and economical magnetostrictive delay lines and information storage devices.

It is still another object of the present invention to provide an information storage device having non-destructive read-out and non-volatile memory.

It is a further object of the present invention to provide a readily adjustable signal delay line.

It is another object of the present invention to generate an ultrasonic strain pulse in a magnetostrictive member without the need for an input transducer winding.

It is another object to provide a readily alterable memory element wherein data may be conveniently erased.

The foregoing objects are realized in accordance with the principles of this invention by establishing in a magnetoelastic member a pair of substantially orthogonal relationships among the plurality of magnetic field components. In one illustrative embodiment thereof, a source of electrical pulses is conductively connected to a longitudinally disposed magnetoelastic member producing therein a circumferentially oriented magnetic field. At a predetermined point in the magnetoelastic member a longitudinally bifurcated magnetic flux is introduced having components parallel to and directed in each of the two opposite senses of the longitudinal axis of the magnetoelastic member. Each of the two oppositely directed longitudinal field components forms, with the circumferentially oriented magnetic field due to the current, a substantially orthogonal intersection. The vector resultant of each intersection is a helical magnetic flux, and since the longitudinal field components of the field pair have been oppositely directed, one such helical magnetic field is right handed and the other left handed. In accordance with the well known properties of magnetoelastic materials, a dimensional deformation or strain is produced along each such right- and left-hand helix forming a net torsional strain which reaches an amplitude maximum in the transition region therebetween. The torsional strain impulse thereby produced propagates through the magnetoelastic member at a velocity approximately given by $\sqrt{G/\rho}$ where G is the shear modulus of the magnetoelastic member and where $\rho$ is the density of the magnetoelastic material, as was mentioned above in relation to the velocity formula for longitudinal impulses. Since the shear modulus for most magnetoelastic materials is smaller than the modulus of elasticity, and since the velocity of propagation is in each case determined by the particular modulus specified by the equations, the velocity of propagation for the torsional impulse will be correspondingly lower than that for a longitudinal impulse. In nickel, for example, the velocity of propagation of torsional impulses is approximately $1.2 \times 10^5$ in./sec.

In further illustrative application of these magnetic principles, the torsional strain impulse so produced may be detected at a point in the magnetoeleastic member remote from the point of generation thereof in a delay line embodiment of this invention. Additionally, a pattern of such longitudinally bifurcated magnetic fields may be established in the magnetoelastic member to effect therein the storage of information and such information may be read out by detecting the pattern of torsional strain impulses produced by the application of a current pulse to such magnetoelastic member.

Accordingly, it is a feature of the present invention that a torsional strain impulse be generated in a magnetoelastic member by the application thereto of oppositely directed, orthogonal magnetic field pairs.

It is another feature of the present invention that ultrasonic impulses be torsionally propagated in a magnetostrictive delay line.

It is a further feature of the present invention to conductively apply electrical driving signals to the magnetoelastic member of a signal delay line to generate therein torsional strain impulses.

It is a further feature of the present invention that information bits be stored in a magnetoelatsic element according to the relative position therein of a plurality of bifarious magnetic field regions.

It is still another feature of the present invention that the delay time of a magnetostrictive delay line be adjusted in accordance with the relative position therein of a bifarious magnetic field region.

The foregoing and other objects and features of the present invention will be more readily understood from the following detailed description and the accompanying drawing in which.

Figure 1:
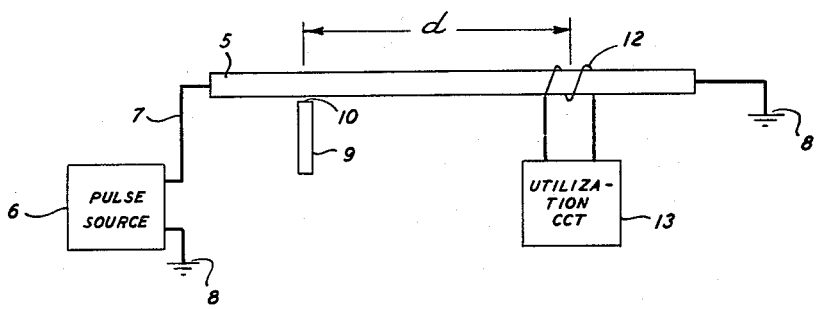
FIG. 1 is a schematic representation of a magnetostrictive delay line in accordance with one illustrative embodiment of this invention.

Referring now to FIG. 1, there is shown an electric circuit for translating electrical impulses into mechanical strain impulses comprising a magnetostrictive member 5 connected to a pulse source 6 via lead 7 and ground returns 8. A source of magnetic flux such as bar magnet 9 is positioned so that one pole 10 thereof is close to or in contact with magnetostrictive member 5. An output winding 12, to which a utilization circuit 13 is connected, is located at a predetermined distance $d$ from pole 10 and advantageously may be wound directly on magnetostrictive member 5 to reduce air gap losses. Given the desired time delay $t$, the distance $d$ is determined by the product $tv$ where $v$ is the velocity of propagation of torsional acoustic impulses in magnetostrictive member 5.

Figure 2:
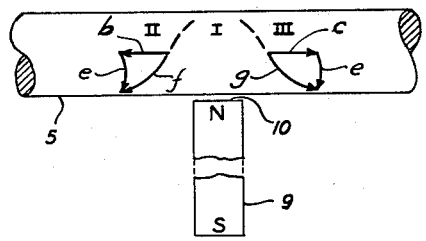
FIG. 2 is an enlarged diagrammatic view of a portion of FIG. 1.

The operation of the circuit of FIG. 1 may be more readily understood by reference to FIG. 2 wherein that portion of magnetostrictive member 5 adjacent to magnet 9 is shown somewhat enlarged. Assuming that pulse source 6 has just applied a positive pulse of current to lead 7, the current pulse flows substantially instantaneously through lead 7 and magnetostrictive member 5 to ground 8. Bar magnet 9 which advantageously may be either a simple bar of permanently magnetized material or a suitably excited electromagnet is shown with its north pole 10 in the immediate proximity of member 5. In accordance with the well known characteristics of magnetic fields, the lines of magnetic induction emanating from north pole 10 enter member 5 and form therein a magnetic field configuration, the principal attributes of which may be approximately described in the three regions therein labeled I, II, and III. For purposes of clarity the relative extent of each of the regions is not shown to scale. In transition region I the magnetic lines of induction from pole 10 are principally transverse to the longitudinal axis of member 5; however, the detailed vector relationships existing in transition region I have been omitted from the drawing not being necessary for the purposes of the present explanation. In regions II and III the lines of induction due to pole 10 are represented by longitudinal field vectors $b$ and $c$, which vectors are parallel to the longitudinal axis of member 5 and oppositely directed to each other. Accordingly, the pole 10 produces in member 5 a bifurcated magnetic flux comprising oppositely directed field vectors $b$ and $c$. Had pole 10 been assumed to be a south magnetic pole, the directions of vectors $b$ and $c$ would, in accordance with convention, be reversed. Other flux source means for producing field vectors $b$ and $c$ in member 5 may now be apparent, in addition to those above mentioned, such as the use of a center-tapped winding coaxially mounted on member 5 and energized by connecting a current source between the center tap and the tied-together ends of the winding, but for convenience, the operation of the apparatus will hereafter be described in terms of the bar magnet 9. The current pulse applied to member 5 has associated with it in accordance with Oersted's principle an accompanying circumferential magnetic field indicated in FIG. 2 by circumferential field vectors $e$. The vector resultant magnetic induction due to longitudinal field vector $b$ and circumferential field vector $e$ is the helical field vector $f$. Similarly, the helical field vector $g$ represents the resultant field due to field vectors $e$ and $c$. Depending upon the particular magnetostrictive coefficient of member 5 there will occur either a contractive or distensive strain along helical field vectors $f$ and $g$, thereby producing a torsional strain impulse. In the case of member 5 comprising a nickel wire having a negative magnetostrictive coefficient, the wire will tend to contract along helical field vectors $f$ and $g$, causing a torsional strain impulse which reaches a maximum amplitude at the center of the transition region I. If, in place of the assumed positive current pulse, a negative pulse were applied to member 5, or, if pole 10 of magnet 9 had been assumed to be a south pole instead of a north pole, the helical field vectors $f$ and $g$ would be interchanged, resulting in a twist in the opposite direction. The torsional strain impulse would still, however, achieve an amplitude maximum in the transition region I regardless of the polarities of flux, current, or magnetostrictive coefficient.

Returning now to the consideration of FIG. 1, the torsional strain pulse produced in member 5 propagates therein and enters that portion of member 5 under winding 12 which is shown positioned at distance $d$ from magnet 9. The pulse of current applied by pulse source 6 to member 5 will have left, after the termination thereof, a remanent circumferential magnetization in member 5. The result of the torsional modification or distortion of this circumferential magnetic field by the torsional strain impulse is to produce a longitudinal field component in member 5, which longitudinal field component links winding 12 generating therein a voltage. Winding 12 is connected to the utilization circuit 13 which may advantageously employ the voltage generated in winding 12 for the accomplishment of any designated purpose. In summary, the apparatus of FIG. 1 functions to convert electrical signal impulses from pulse source 6 into ultrasonic, torsional strain impulses in member 5, and after a time delay determined by the effective length, distance $d$, of the delay line, to reconvert the torsional strain impulses into electrical impulses in winding 12. The distance $d$ is conveniently adjusted by locating magnet 9 at any point along member 5 between the left-hand end thereof and winding 12, thereby providing a delay line having a variable or adjustable delay time.

In the specific illustrative embodiment just described, there is induced substantially instantaneously with the rise and fall of the current pulse applied to member 5, a voltage pulse in winding 12 by an action similar to that occurring in the well known current transformer. This voltage pulse is, of course, independent of the magnetostrictive effects priorly described. Depending upon the particular characteristics of utilization circuit 13, and the duration of the current pulse applied by pulse source 6 this voltage pulse may acquire varying degrees of importance. Since the duration of the current pulse required to initiate a magnetoelastic strain of usable magnitude is advantageously made very small compared to the desired time delay, the difference in time of occurrence in winding 12 between the voltage pulse due to current transformer action and that of the voltage pulse induced in winding 12 by the arrival of the mechanical strain impulse is ordinarily sufficiently large so as to be readily resolvable by utilization circuit 13. Of course, suitable blanking circuits triggered by pulse source 6 may be included in utilization circuit 13 and are readily devised by those skilled in the art.

It should be noted that in addition to the torsional strain impulses generated in member 5, the longitudinal flux components applied thereto result in the production of longitudinal strain impulses which propagate through member 5 at their characteristic velocity, which velocity, as mentioned above, is higher than that of the simultaneously produced torsion strain impulses. These longitudinal strain impulses upon arriving under winding 12 will produce no longitudinal component from the existing circumferential magnetic field in member 5, and hence no voltage is induced in winding 12 upon their arrival thereunder. However, by providing a horseshoe magnet as in the prior art, disposed so as to produce a longitudinal magnetic field in member 5 under winding 12, the longitudinal strain impulses may be detected in winding 12 before the arrival of the more slowly travelling torsional strain impulses. It is thus possible to construct a dual purpose delay line by detecting both the longitudinal and torsional strain impulses at the output. In this connection it may be noted that while a reversal of the polarity of the current or of pole 10 in FIG. 2 will bring about a reversal of torsional twist in member 5, no reversal is produced in the longitudinal strain impulse.

Figure 3:
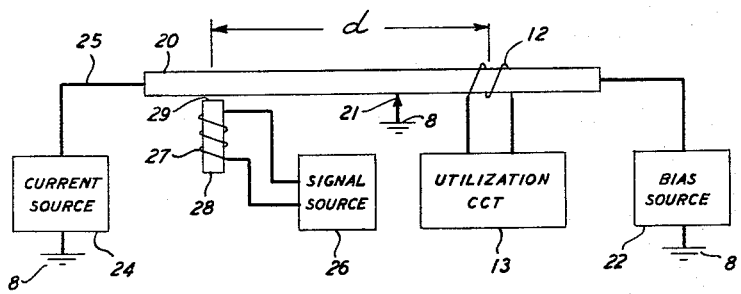
FIG. 3 is a schematic representation of another form of magnetostrictive delay line in accordance with this invention.

While most magnetoelastic materials exhibit a magnetic retentivity sufficient for the above-described purpose, there is shown in the right-hand portion of FIG. 3 an arrangement suitable for a magnetoelastic member 20 not possessing, in the region of winding 12, the retentive properties of member 5. A ground connection 21 is made at a point on member 20 on that side of output winding 12 toward which the torsional impulses arrive. Ground connection 21 must provide a flexible contact with member 20 so as not to appreciably damp the torsional impulses, and such contact advantageously may be achieved by the use of a mercury pool or other equally well known electrical contact means allowing mechanical rotation of member 20. A bias source 22 is connected to the right-hand end of member 20, and an electric circuit comprising ground 8, bias source 22, member 20, ground connection 21, and ground 8 is thereby completed.

The conduction of current in member 20 between the right-hand end thereof and ground connection 21 gives rise to a circumferential magnetic field which may be set at the desired level by selection of the magnitude and polarity of the current supplied by bias source 22. A simple battery and rheostat advantageously comprise bias source 22. In this manner, the circumferential field required for the operation of winding 12 is obtained without regard to the remanent characteristics of member 20. The circuit comprising bias source 22, ground 8, and ground connection 21 can, of course, advantageously be utilized with a retentive magnetostrictive member to achieve an output signal from winding 12 whose magnitude and polarity may be adjusted to suit the characteristics of utilization circuit 13 by adjusting the magnitude and the polarity of the current supplied by bias source 22.

In the left-hand portion of FIG. 3 an arrangement alternative to that of FIG. 1 is depicted. In this embodiment current source 24 applies to member 20 an electric current via lead 25, ground 8, and ground connection 21. Signal source 26 is connected to winding 27 of bar 28, which bar when energized by the signals from signal source 26 becomes a bar electromagnet having a magnetic pole at each end thereof. Conditions similar to those shown in FIG. 2 advantageously may be established in member 20 in the region of pole 29 of bar 28 by proper selection of the polarity of current source 24 and signal source 26. In this embodiment the bifarious magnetic field, advantageously, is established by the signal source, whereas in the embodiment of FIG. 1 it is the circumferential magnetic field that is established by the signal. In each case corresponding torsional strain impulses are produced in the magnetoelastic member but the embodiment of FIG. 3 eliminates the voltage pulse due to current transformer action discussed above in connection with FIG. 1 because the signal source is here not conductively connected to the magnetostrictive member.

On the other hand, where the aforementioned current transformer effect can be tolerated, current source 24 advantageously may be operated simultaneously with source 26 in similar manner to source 6. In this case, the strain impulse signal is launched as the cooperative result of electrical current signals simultaneously supplied by sources 24 and 26.

Figure 4:
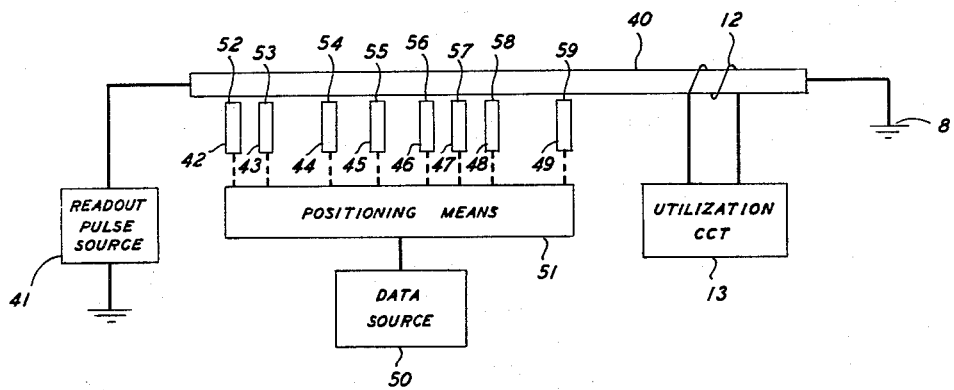
FIG. 4 is a schematic representation of an information storage device in accordance with a further illustrative embodiment of this invention.

In FIG. 4 there is depicted a form of information storage device in accordance with this invention comprising magnetostrictive member 40 having characteristics similar to that of member 5 of FIG. 1, read-out signal source 41 conductively connected to member 40, movable magnets 42–49 positioned along member 40, data source 50, and positioning means 51 for arranging magnets 42–49 in response to information signals from data source 50. While only eight such bar magnets are shown in the drawing, it will be appreciated that any desired number of such magnets may be positioned along member 40 between the left-hand end thereof and output winding 12. A number of different modes of information storage may be achieved through permutations of the arrangement illustrated wherein the spacing between successive magnetic poles 52–59 of bar magnets 42–49, the polarity of such poles, or both the spacing and polarity are determinable by positioning means 51 to establish a pattern of bifarious magnetic fields in member 40 in accordance with the information signals supplied by data source 50. Each of the bifarious magnetic fields established in member 40 due to a north magnetic pole among poles 52–59 will resemble the field pair represented in FIG. 2 by magnetic field vectors b and c, while for a south pole among poles 52–59 the directions of field vectors b and c would, correspondingly, be reversed, as was priorly discussed above in connection with FIG. 2. Where member 40 is sufficiently retentive, the bar magnets 42–49 need only momentarily be placed in contact or close proximity with member 40 by positioning means 51 and the pattern or remanent magnetic induction may be relied upon to represent the particular data sequence priorly represented by the spacing and polarity of bar magnets 42–49. Positioning means 51 advantageously may comprise any of the well known mechanical position indexing devices that are operative in response to electrical driving stimuli such as a stepping switch with suitable mechanical linkage connecting its armature with bar magnets 42–49.

After the pattern of magnetization has been established in member 40 by the operation of positioning means 51 and data source 50, an indication of the stored data pattern may be delivered to utilization circuit 13 by operation of read-out pulse source 41 which applies a single current pulse to member 40. The current pulse produces a circumferential magnetic field throughout the length of member 40, producing a torsional strain impulse substantially simultaneously in each portion of member 40 priorly conditioned by the presence of magnetic poles 52–59. These torsional impulses propagate in member 40, and upon arriving sequentially in that portion of member 40 under winding 12 produce, by distorting the remanent circumferential field established in member 40 by the current pulse from read-out pulse source 41, a sequence of longitudinal magnetic field fluctuations which link winding 12 and induce therein a potential which is delivered to utilization circuit 13 connected to winding 12.

Figure 5:
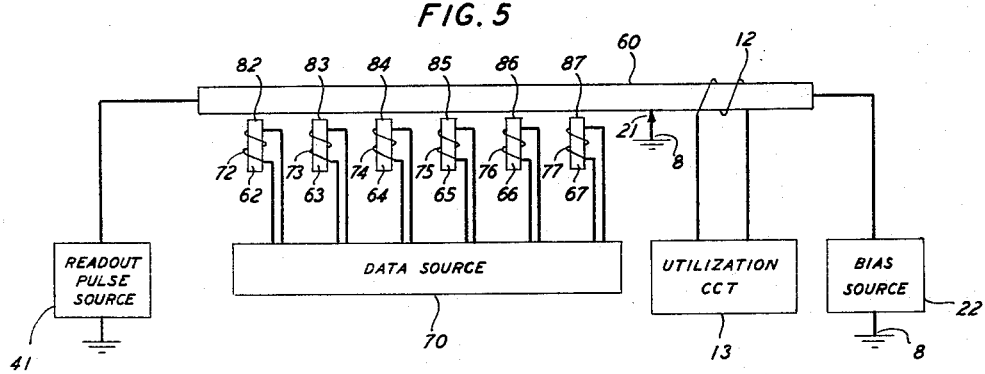
FIG. 5 is a schematic representation of another form of information storage device in accordance with this invention.

An alternative embodiment of an information storage device is schematically depicted in FIG. 5. Information from data source 70 is stored as a pattern of bifarious magnetic field regions established in magnetoelastic member 60 by the selective energization by data source 70 of windings 72–77 of bars 62–67, respectively. Bars 62–67 may advantageously be made of any material exhibiting negligible remanence, such as soft iron. The energization of windings 72–77 determines the polarity of the poles 82–87 disposed in proximity or contact with member 60. Once the pattern of bifarious magnetic field regions has been established in member 60, the pattern may be read out, that is, a sequence of electrical signals representative of the pattern may be delivered to utilization circuit 13 by operation of read-out pulse source 41 which applies a single current pulse to member 60. The application of the current pulse to member 60 produces a torsional strain impulse in each region thereof adjacent to those of poles 82–87 which have been energized by data source 70. Each such torsional strain impulse upon its arrival in that portion of member 60 under winding 12 produces a longitudinal distortion of the cricumferential magnetic flux produced in member 60 between the right-hand end thereof and ground connection 21 by bias source 22 as described above in connection with the operation of the right-hand portion of the apparatus of FIG. 3.

The amplitude of the current pulse applied to members 40 and 60 by read-out pulse source 41 may be increased above and beyond that required to generate the torsional strain impulse, and if such amplitude be raised to a level that will completely saturate these members, the residual, longitudinally bifurcated magnetic fields may be conveniently erased. Accordingly, destructive or non-destructive read-out is obtainable depending upon the amplitude of the pulse supplied by read-out pulse source 41.

It is to be understood that numerous other arrangements and modifications, as well as other applications, may be devised by one skilled in the art without departing from the spirit and scope of this invention.

What is claimed is:

1. An electromechanical signal translation device comprising a source of electrical signal currents, a conductive magnetoelastic member, means conductively connecting said source to said member to generate circumferential fields therein corresponding to said signal currents, and means for producing a pair of oppositely directed diverging longitudinal magnetic fields in said member, said longitudinal fields being diverging from at least one point selectively positionable along said member.

2. A signal translation device in accordance with claim 1 wherein said means for producing said pair of oppositely directed longitudinal magnetic fields comprises bipolar flux source means having one of its poles in substantially closer proximity with said member than the other of its poles.

3. A signal translation device in accordance with claim 2 further comprising means for controlling said magnetic fields including a winding coupled to said flux source means, said winding being physically divorced from said member.

4. A magnetostrictive delay line including a conductive magnetoelastic member and means for generating torsional impulses therein comprising means for applying a longitudinal bias current to said member to establish therein a circumferential magnetic field, a source of electrical signal pulses, flux source means controlled by said source of signal pulses for producing a longitudinally bifurcated magnetic field at a first point in said member during each of said signal pulses, said bifurcated field having oppositely-directed components substantially orthogonal to said circumferential field, and torsional impulse detecting means positioned at a second point on said member longitudinally displaced from said first point.

5. Apparatus for recording and reproducing information signals in a magnetoelastic member comprising means for inducing a pattern of selectively positionable longitudinally bifurcated magnetic flux regions representative of said information in said member, means for applying a read-out current pulse to said member, and means for detecting the sequence of torsional strain impulses produced in said member by said current pulse.

6. In an information storage device the combination comprising a magnetoelastic member, a source of electrical data signals, means controlled by said source for producing a pattern of selectively positionable longitudinally bifarious magnetic fields representative of said data in said member, a source of electrical read-out signals conductively connected to said member, and output means for detecting the torsional strain impulses produced in said member by said read-out signals.

7. An information storage device in accordance with claim 6 wherein said first-mentioned means comprises a plurality of movable magnetic bars in substantially axially perpendicular juxtaposition with said member.

8. An information storage device in accordance with claim 6 wherein said first-mentioned means comprises a plurality of electromagnets selectively energized by said source of electrical data signals, said electromagnets being slidably positionable along said member.

9. An information storage device in accordance with claim 6 wherein said output means comprises a winding inductively coupled to said member, and bias current means for producing a circumferential magnetic field in said member under said winding.

References Cited in the file of this patent

UNITED STATES PATENTS

| | | |
|---|---|---|
| 2,667,621 | Burns et al. | Jan. 26, 1954 |
| 2,709,243 | Babcock | May 24, 1955 |
| 2,736,824 | Roberts | Feb. 28, 1956 |
| 2,814,793 | Bonn | Nov. 26, 1957 |
| 2,828,470 | Mason | Mar. 25, 1958 |
| 2,876,419 | Gianola et al. | Mar. 3, 1959 |
| 2,897,294 | Lipkin | July 28, 1959 |

FOREIGN PATENTS

| | | |
|---|---|---|
| 758,647 | Great Britain | Oct. 10, 1956 |
| 862,364 | Great Britain | Mar. 8, 1961 |

OTHER REFERENCES

Publication I, Bates, L. F. "Modern Magnetism," 3rd edition, Cambridge University Press, 1951, pp. 415–417.